United States Patent
Wilson

[11] 3,890,867
[45] June 24, 1975

[54] POTATO CHIP SLICING DEVICE

[76] Inventor: Mary P. Wilson, 6241 S.W. 20th Ter., Miami, Fla. 33155

[22] Filed: Mar. 11, 1974

[21] Appl. No.: 450,143

[52] U.S. Cl. ............... 83/404; 83/435.1; 83/437; 83/858
[51] Int. Cl. .......................................... B26d 4/44
[58] Field of Search ......... 83/858, 856, 435.1, 437, 83/404, 404.3, 404.4

[56] References Cited
UNITED STATES PATENTS

| | | | |
|---|---|---|---|
| 291,305 | 1/1884 | Dames | 83/404.3 X |
| 2,103,537 | 12/1937 | Killman et al. | 83/858 X |
| 2,473,165 | 6/1949 | McKinney | 83/404.3 X |
| 2,924,256 | 2/1960 | Reiland | 83/435.1 X |
| 3,217,768 | 11/1965 | Lamb | 83/858 X |

Primary Examiner—J. M. Meister

[57] ABSTRACT

A device adapted to receive a potato and then slice the same in a manner providing thin strips of potato of uniform thickness suitable for frying to make potato chips, the device including an elongated housing of a generally U-shaped cross-section having a series of spaced apart angled cutter blades disposed in the bottom of the housing and having a potato holding and pushing block guidable in the housing in a manner to pass over the cutting blade so as to push the potato thereover to slice the potato into the thin strips for potato chips, the device operable in a manner maintaining safe clearance between an individual's hands and the cutting blade to eliminate any possibility of injury to an individual's hands from the cutter blade.

2 Claims, 5 Drawing Figures

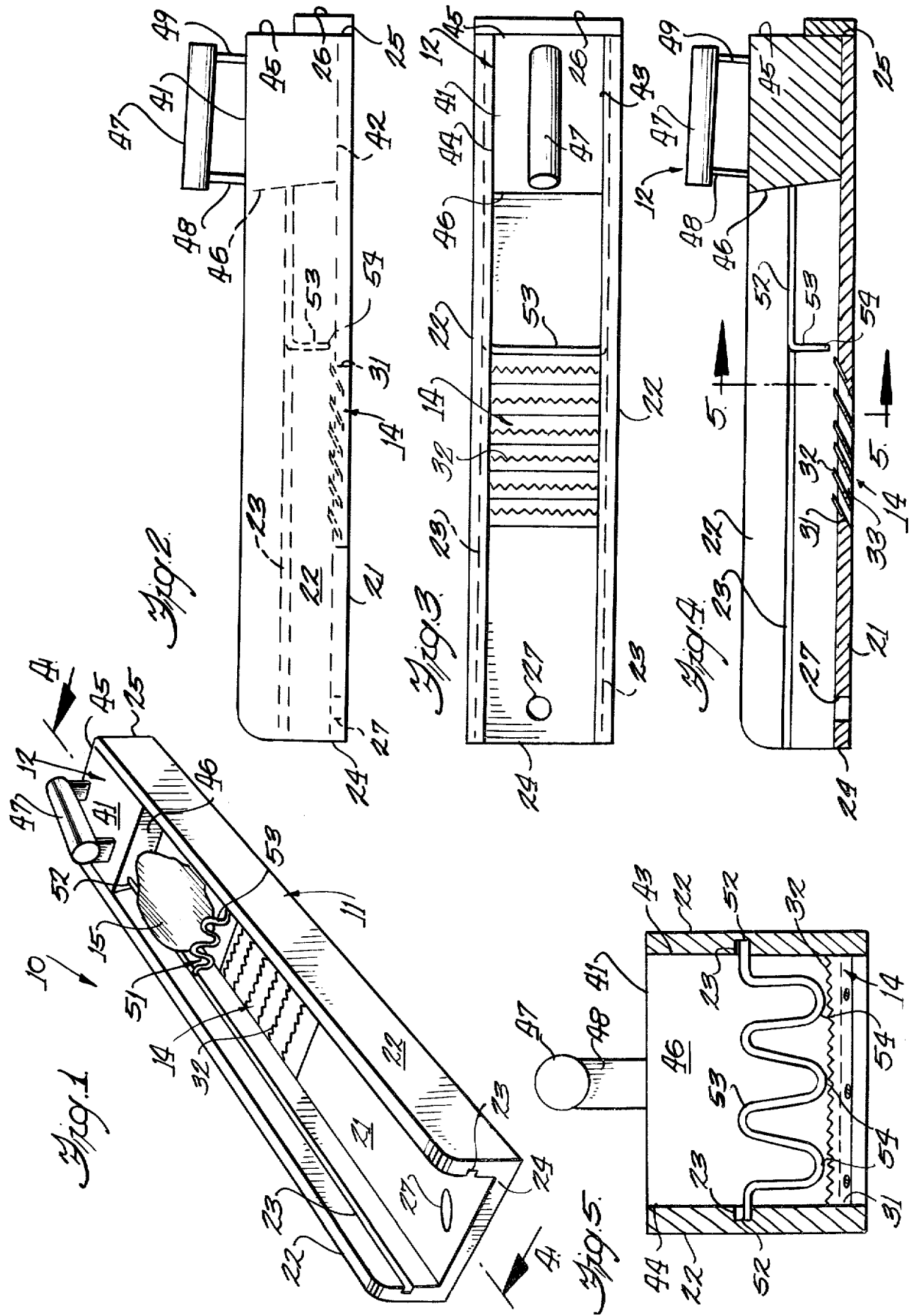

POTATO CHIP SLICING DEVICE

BACKGROUND OF THE INVENTION

1. Field of the Invention

This invention relates generally to cutting devices and more particularly to a novel device intended to receive a potato and then slice the same into a plurality of strips of uniform thickness suitable for frying to make potato chips.

2. Description of the Prior Art

While there are many types of houseware gadgets available in the prior art for use in the preparation of food products at home, such as egg beaters, potato peelers, graters, and the like, there are presently no devices for the slicing of a potato into thin strips of uniform thickness suitable for frying at home to make potato chips. Presently the only manner available to slice such potato is to do so by hand using a carving knife or the like, with the resultant strips being of different thickness thus requiring different frying times among the strips, such procedure also posing a hazard to the hands of an individual as to the possibility of cutting themselves should the knife slip or the like in the handling of the potato, this being quite possible in view of the normal slipperiness of an ordinary potato.

SUMMARY OF THE INVENTION

The present invention provides an efficient and easy to use potato slicing device adapted to receive a potato therein and then push the potato therelong over a plurality of cutter blades to slice the potato into slices of uniform thickness having the same cooking requirements so as to make the preparation and frying of potato chips at home a pleasurable and enjoyable experience.

It is a feature of the present invention to provide a potato slicing device for the preparation of potato chips at home and which receives and slices a potato in a manner protecting an individual's hands from injury.

A further feature of the present invention provides a potato slicing device intended for the slicing of a potato into thin uniform thickness strips for the making of potato chips and which is relatively simple in its construction and which therefore may be readily manufactured at a relatively low cost and by simple manufacturing methods.

Yet still a further feature of the present invention provides a potato slicing device for the slicing of a potato into thin strips for the making of potato chips, the device being possessed of few parts and therefore unlikely to get out of order; it being rugged and durable and therefore guaranteeable by the manufacturer to withstand many years of intended usage; it being easy to use and reliable and efficient in operation; and it otherwise being well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the potato slicing device of the present invention;

FIG. 2 is a side elevational view of the potato slicing device;

FIG. 3 is a top plan view of the potato slicing device;

FIG. 4 is a cross-sectional view taken along Line 4—4 of FIG. 1; and

FIG. 5 is an enlarged cross-sectional view taken along Line 5—5 of FIG. 4.

DESCRIPTION OF THE PREFERRED EMBODIMENT

Referring now to the drawings in detail there is illustrated a preferred form of a potato slicing device intended for the slicing of a potato into a plurality of thin strips of uniform thickness and which is designated generally in its entirety by the reference numeral 10 and which is comprised of a track 11, a pushing block 12 arranged for reciprocal movement along the length of the track, and a plurality of cutter blades 14 mounted in the bottom surface of the track and adapted to engage the bottom of a potato 15 as the same is pushed thereover by the pusher block 12.

The track 11 is of an elongated longitudinal configuration having a U-shaped cross-section and formed of a horizontal bottom surface 21 and a pair of opposed vertically extending side wall surfaces 22 each having a horizontally extending guide groove 23 extending longitudinally through the interior surface thereof in a position spaced approximately midway between the top edge of the side walls and the bottom surface 21. The track is provided with a front edge 24 and a back edge 25 which has affixed thereto a transversely projecting vertically extending stop member 26 which extends between the back edges of the side wall surfaces 22. The bottom surface is provided with an aperture 27 centrally thereof and disposed adjacent front edge 24 and is intended for use in the hanging of the device 10 from a suitable nail or peg during periods of storage and non-use of the device. Disposed approximately intermediate front and back ends 24 and 25 of bottom surface 27 is a rectangularly shaped opening 31 having a plurality of cutter blades 14 extending transversely of the opening between side walls 22 with the cutter blades being oriented at an incline upwardly and toward the back edge 25 of the track, each cutter blade having a leading jagged edge saw-tooth type cutting edge 32. As seen in the drawings the cutter blades are disposed in spaced apart tandem relationship with uniform openings 33 provided between the blades for the passage of slices of the potato 15 therebetween as the potato is pushed over the cutter blades in a manner to effect the slicing of the potato.

The pusher block 12 is of a rectangular configuration having a top surface 41, a bottom surface 42, opposed side surfaces 43 and 44, a back surface 45, and a front leading surface 46 which is beveled inwardly and downward from the top surface to the bottom surface such as seen in the drawings. A cylindrical handle 47 is connected by brackets 48 and 49 to the top surface 41 and is adapted to be readily grasped in the hand of an individual for sliding the pusher block along the bottom surface 21 of the track 11 between front edge 24 and stop member 26.

Secured to front wall surface 46 of pushing block 12 is a generally U-shaped frame assembly 51 having a pair of opposed horizontally projecting leg members 52 adapted to ride longitudinally in opposed guide grooves 23 with one end of each leg affixed to front surface 46 of the pushing block 12 and with the opposite end terminating in the base portion 53 of the U-shaped frame which base portion extends between such legs in a general sine wave configuration of up and down loops with such down loops designated by reference numeral 54 terminating immediately above the bottom surface 21.

In operation a potato 15 is placed within frame assembly 51 with the pushing block 12 in engagement with stop member 26, after which an individual grasps handle 47 and moves the pushing block longitudinally along track 11 thus engaging the bottom surface of the potato with the cutting blade 14 in a manner to slice thin strips of uniform thickness from the potato which are discharged through openings 33 intermediate the blades so as to be later collected and fried for the making of potato chips. After making a path with the potato over the cutting blades, the pushing device is withdrawn longitudinally of the track to drag the potato back across the cutting blades to the starting position at which time the pushing block is then again moved in a direction to push the potato into engagement with the cutting blades to slice the potato into further strips by the cutting blades. This back and forth movement of the pushing block and potato relative to the cutting blades along the track is continued until the potato has been sliced into the maximum number of thin uniform strips by the cutter blades.

It is to be understood that the leading edges 32 of the cutter blades 14 may be of a smooth knife shape or may be serrated across the length thereof, and that the guide grooves 23 guide the longitudinal movement of the frame assembly 51 and pushing block 12 along the length of the track 11.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A potato peel slicing device intended for the slicing of a potato into thin slices of uniform thickness for the making of potato chips, and the like, the device comprising, in combination:

an elongated longitudinally extending track having a substantially U-shaped transverse cross-section shape formed of a horizontally extending bottom surface and a pair of opposed vertically extending side wall surfaces defining a runway therebetween;

an opening in said bottom surface extending longitudinally thereof and between opposite side wall surfaces and disposed approximately midway between opposite ends of said bottom surface;

said track having a front end and a back end, a vertically extending stop member disposed adjacent to said back end and interconnecting said side wall surfaces and projecting to a level above the heighth of the bottom surface, each of said track side wall surfaces being provided with a longitudinally extending slot extending from end to end thereof parallel to said bottom surface and spaced approximately midway between said bottom surface and the top edge of said side wall surfaces and wherein said frame assembly is comprised of a generally U-shaped member having rod-like leg members projecting horizontally and of a dimension adapted to be slidingly received in an associated one of said grooves for guiding said frame assembly longitudinally along said runway;

a plurality of cutting blade members disposed in said bottom surface opening and extending transversely of said track between said opposite side wall surfaces, said cutter blades being inclined at a direction upwardly of said bottom surface and inclined toward said track back end, the spacing between each of the blades being substantially identical, said blades having a leading cutting edge which is disposed at a level above the level of the interior surface of said bottom surface;

a rectangularly shaped pushing block having a top surface, a bottom surface, opposed side surfaces, a back surface, and a front leading surface, said block being of a width to be received in said runway with said side surfaces in sliding juxtaposition with the interior surfaces of said side wall surfaces of said track whereby said pushing block may be moved reciprocally in opposite directions along said runway between said front end and said back end of said bottom surface, the front leading edge of said pushing block being beveled inwardly and downwardly from said top surface to said bottom surface, and a cylindrical handle member being affixed to said top surface by a pair of longitudinally spaced apart bracket means with the handle adapted to be readily grasped in the hand of an individual to effect the reciprocal movement of said pushing block along said runway; and frame means associated with said pushing block and projecting forwardly of the front surface thereof and adapted to receive a potato therein for retaining the potato relative to the pushing block whereby movement of the pushing block from the back end to the front end will push the potato over the cutting blades to slice the potato into a plurality of thin strips of uniform thickness suitable for the making of potato chips, said base member of said frame assembly being formed of a cylindrical rod bent in the desired configuration of a general sine wave and having bottom loop portions terminating adjacent the interior surface of said track bottom surface.

2. The potato slicing device as set forth in claim 1 further comprising an opening disposed centrally of said bottom surface adjacent said front end thereof and adapted for use in the hanging of the device from a suitable peg and the like for the storage of the device during periods of nonuse.

* * * * *